United States Patent
Chaudhry et al.

(10) Patent No.: US 9,939,175 B2
(45) Date of Patent: Apr. 10, 2018

(54) FLUE DAMPER CONTROL ALGORITHM FOR STANDING PILOT TYPE FUEL-FIRED WATER HEATER

(71) Applicant: Rheem Manufacturing Company, Atlanta, GA (US)

(72) Inventors: Raheel A. Chaudhry, Montgomery, AL (US); Jozef Boros, Montgomery, AL (US); Gianpiero Turrin, Padua (IT)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 897 days.

(21) Appl. No.: 14/016,746

(22) Filed: Sep. 3, 2013

(65) Prior Publication Data

US 2014/0120484 A1    May 1, 2014

Related U.S. Application Data

(60) Provisional application No. 61/720,906, filed on Oct. 31, 2012.

(51) Int. Cl.
*F24H 9/20* (2006.01)
*F24H 1/20* (2006.01)
*G05D 23/19* (2006.01)

(52) U.S. Cl.
CPC .......... *F24H 9/2035* (2013.01); *F24H 1/206* (2013.01); *G05D 23/1931* (2013.01)

(58) Field of Classification Search
CPC ................ F24H 9/2035; F24H 1/186
USPC .................. 122/14.21, 14.22, 18.3
See application file for complete search history.

(56) References Cited

U.S. PATENT DOCUMENTS

| | | | |
|---|---|---|---|
| 4,289,271 A | 9/1981 | Barth | |
| 4,383,671 A | 5/1983 | Hayes | |
| 4,406,396 A | 9/1983 | Habegger | |
| 7,438,023 B2 * | 10/2008 | Lee | F23N 5/102 122/14.2 |
| 2003/0150406 A1 * | 8/2003 | Takagi | F01P 7/167 123/41.1 |
| 2010/0058997 A1 * | 3/2010 | Lannes | F24H 9/0026 122/14.21 |

(Continued)

FOREIGN PATENT DOCUMENTS

GB        2071878        9/1981

*Primary Examiner* — Alissa Tompkins
*Assistant Examiner* — John Bargero
(74) *Attorney, Agent, or Firm* — King & Spaldng LLP

(57) ABSTRACT

In a fuel-fired water heater with a standing pilot burner and a motorized flue damper, a specially designed controller is utilized to prevent overheating of water stored in the tank portion of the water heater caused by the hot combustion gases continuously generated by the pilot burner during standby periods of the water heater in which its main fuel burner is not being fired. The controller has a selectively variable water temperature control set point temperature and is operable to sense both ambient temperature and the tank water temperature and to open the flue damper and/or keep it open, after the main burner is off, in response to the presence for a predetermined continuous time period of a predetermined relationship of at least the selected temperature control set point temperature and the sensed ambient temperature.

15 Claims, 2 Drawing Sheets

(56) References Cited

U.S. PATENT DOCUMENTS

2011/0048340 A1     3/2011   Anderson et al.
2011/0054711 A1     3/2011   Kucera et al.

\* cited by examiner

FLUE DAMPER CONTROL ALGORITHM FOR STANDING PILOT TYPE FUEL-FIRED WATER HEATER

CROSS-REFERENCE TO RELATED APPLICATION

The present application claims the benefit of the filing date of provisional U.S. patent application No. 61/720,906 filed Oct. 31, 2012. The entire disclosure of the provisional application is hereby incorporated herein by this reference.

BACKGROUND OF THE INVENTION

In a representatively illustrated embodiment thereof, this invention provides a standing pilot type fuel-fired water heater having incorporated therein a specially designed control algorithm which prevents overheating of water stored in the tank portion of the water heater during non-firing periods of the water heater's main burner.

Fuel-fired water heaters typically have a main fuel burner which is ignited by a smaller pilot burner in response to a sensed demand for heating water stored in a tank portion of the water heater. During "standby" periods of the water heater (when its main burner is not firing), a damper in the flue portion of the water heater is normally held in a closed position and opened upon a subsequent firing of the main burner.

When the water is provided with a "standing" pilot burner, whose flame burns continuously, the possibility exists that the tank water may be undesirably overheated by the hot combustion products continuously generated by the pilot burner. In view of this possibility, a need exists for control apparatus and methods for preventing such overheating. It is to this need that the present invention is primarily directed.

DETAILED DESCRIPTION

Figure 1:
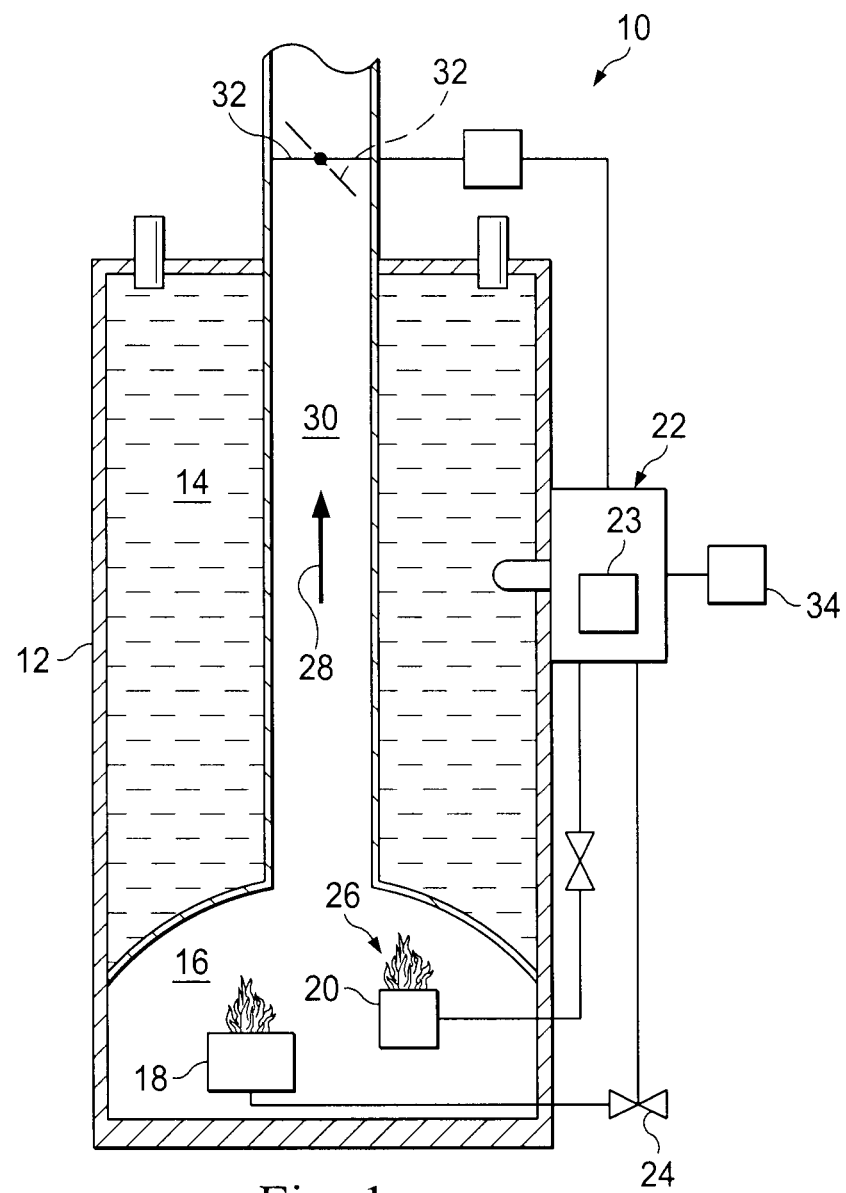
FIG. 1 is a schematic illustration of a representative fuel-fired, standing pilot type water heater embodying principles of the present invention.

Fuel-fired liquid heating apparatus is schematically depicted in FIG. 1 and is representatively a fuel-fired water heater 10, but could alternatively be another type of fuel-fired liquid heating apparatus, such as a boiler, without departing from principles of the present invention. Water heater 10 has the usual insulated tank 12 in which water 14 to be heated may be stored. Underlying the tank 12 is a combustion chamber 16 in which main and pilot burners 18,20 are disposed. Pilot burner 20 is a "standing" pilot burner which burns continuously and serves to ignite the main burner 18 when a controller 22 having a pre-programmed microprocessor 23 therein senses that the temperature of the water 14 is below a set point temperature of the controller 22 and responsively opens a main burner fuel supply valve 24. Fuel (representatively gas) supplied to the main burner 18 is then ignited by the standing pilot flame 26.

During standby periods of the water heater 10 (when the main burner 18 is not firing), the standing pilot burner flame 26 continues to create hot combustion gases 28 that rise through a flue 30 communicating with the combustion chamber 16, the flue 30 having a motor-driven damper 32 positioned in an upper end portion thereof for rotation between a solid line closed position and a dotted line open position. During water heater standby periods the damper 32 is normally motor-driven to and held in its solid line closed position in a suitable known manner by operation of the controller 22 which regulates the position of the damper 32.

Particularly when the ambient temperature externally adjacent the water heater 10 is at a high level, the potential exists for the hot standing pilot burner gases 28 to cause undesirable overheating of the tank water 14 when the water heater 10 is in a standby mode with the damper 32 closed. To combat this potential tank water overheating problem the controller 22 has a specially designed combination sensed water/ambient temperature-based damper control algorithm built into its microprocessor portion 23. In addition to operating the main burner 18 in the usual manner to maintain the tank water 14 at a predetermined set point temperature, the controller 22 senses excessive tank water temperature during standby periods and responsively opens the flue damper 32 to allow pilot burner flame combustion gases 28 to more readily escape through the flue and thereby prevent tank water overheating during water heater standby periods.

According to an aspect of the present invention, the controller 22, via a suitable temperature sensor 34, also monitors the ambient temperature externally adjacent the water heater 10 and transmits a sensed ambient temperature signal to the controller 22 which utilizes such signal, along with the sensed tank water temperature, in the previously mentioned algorithm to prevent overheating of the tank water 14 during standby periods of the water heater 10.

Figure 2:
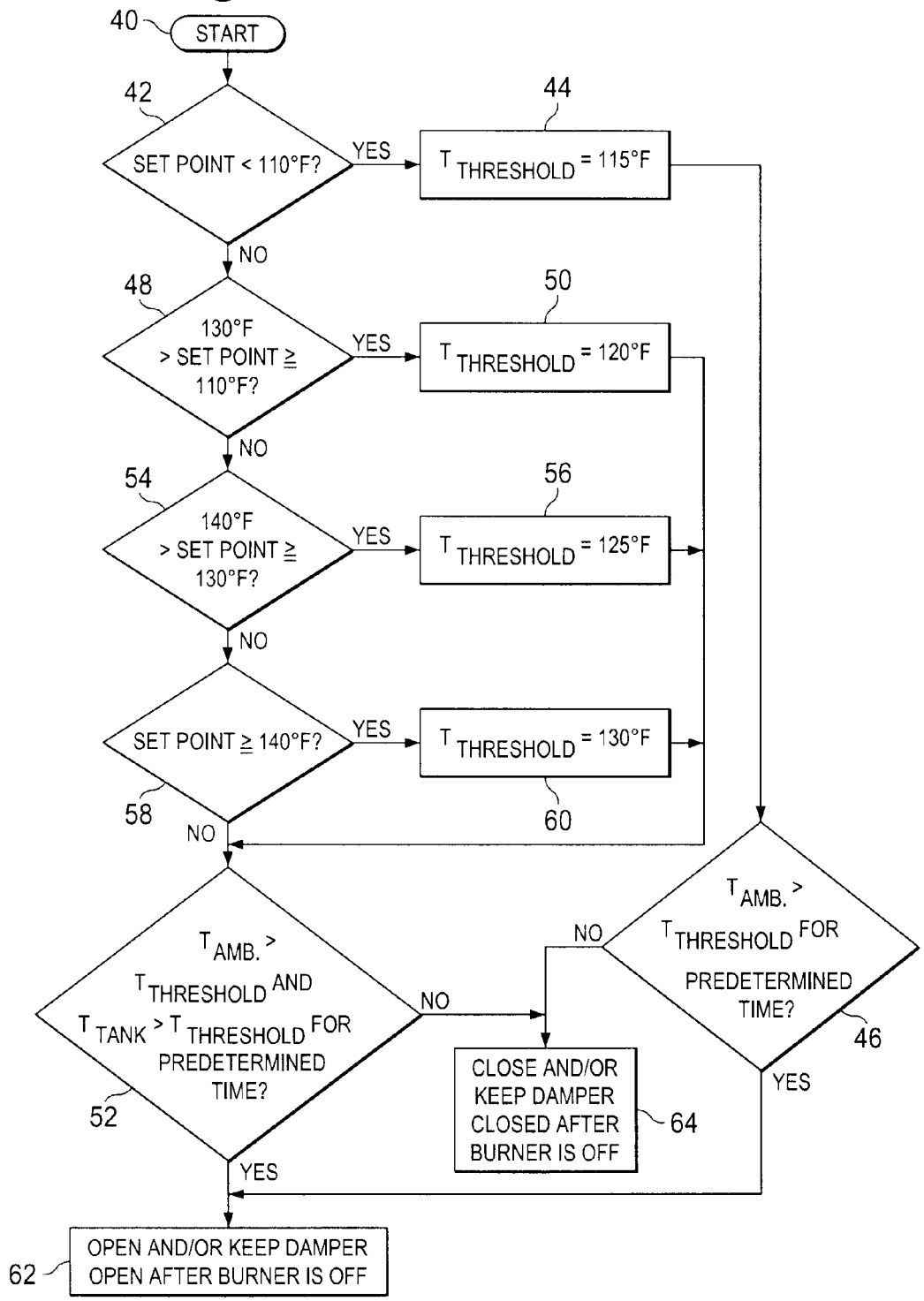
FIG. 2 is a logic flow chart functionally illustrating a specially designed flue damper control algorithm operatively incorporated in the water heater.

The functions of the combination water/ambient temperature-utilizing algorithm are depicted in the logic flow chart of FIG. 2 to which reference is now made. In the following description of the FIG. 2 algorithm, various illustrative numerical values and ranges are utilized for descriptive purposes. It is to be understood, however, that such values and ranges are utilized by way of non-limiting example only, and that other numerical values and ranges could be utilized if desired without departing from principles of the present invention.

Upon a start-up of the water heater 10 at step 40, at which a controller water temperature set point is selected, a transfer is made from step 40 to step 42 at which a query is made as to whether the selected set point is less than 110° F. If it is, a transfer is made to step 44 at which a temperature parameter $T_{Threshold}$ is set to 115° F. and a transfer is made to step 46. If the query answer at step 42 is no, a transfer is made from step 42 to step 48 at which a query is made as to whether the selected set point is less than 130° F. and greater than or equal to 110° F. If it is, a transfer is made to step 50 at which $T_{Threshold}$ is set to 120° F. and a transfer is made to step 52. If the query answer at step 48 is negative, a transfer is made from step 48 to step 54 at which a query is made as to whether the selected set point is less than 140° F. and greater than or equal to 130° F. If it is, a transfer is made to step 56 at which $T_{Threshold}$ is set to 125° F. and a transfer is made to step 52.

If the query answer at step 54 is negative, a transfer is made from step 54 to step 58 at which a query is made as to whether the selected set point is greater than or equal to 140° F. If it is, a transfer is made to step 60 at which $T_{Threshold}$ is set to 130° F. When the query answer at step 58 is negative a transfer is also made to step 52.

If the selected set point temperature is less than 110° F., the algorithm has transferred to step 46 and operates to monitor the ambient temperature $T_{Amb.}$ and responsively control the damper 32 to prevent overheating of the tank water 14. Specifically, at step 46 a query is made as to whether $T_{Amb.}$ has been greater than $T_{Threshold}$ continuously for at least a predetermined time (for example, five minutes) as measured by a clock portion of the controller 22. If the query answer at step 46 is yes, a transfer is made to step 62 at which the damper 32 is opened if the transfer to step 62 occurs during a standby period during which the damper 32 is closed, or the damper 32 is kept open after the main burner 18 is shut down to initiate a standby period. On the other hand, if the query answer at step 46 is no, a transfer is made from step 46 to step 64 at which the damper 32 is closed if open during a standby period, or kept closed after main burner shutdown initiates a standby period.

After a transfer is made from step 46 to step 62 or step 64, the clock is reset, and the ambient/threshold temperature-based monitoring is continued at step 46 which may subsequently switch the damper control from step 62 to step 64, or from step 64 to step 62, as necessary depending on the sensed ambient temperature and elapsed clock time.

If the selected set point temperature is such that a transfer has been made to step 52 (via step 48, 54 or 58), the algorithm operates to monitor both the ambient temperature $T_{Amb.}$ and the tank water temperature $T_{Tank}$ and responsively control the damper 32 to prevent overheating of the tank water 14. A query is made at step 52 as to whether both the sensed ambient temperature $T_{Amb.}$ and sensed tank water temperature $T_{Tank}$ have been greater than $T_{Threshold}$ continuously for at least a predetermined time as measured by the clock portion of the controller 32. If this query answer is yes, a transfer is made from step 52 to step 62 at which the damper 32 is opened if the transfer to step 62 occurs during a standby period during which the damper 32 is closed, or the damper 32 is kept open after the main burner 18 is shut down to initiate a standby period. On the other hand, if the query answer at step 52 is no, a transfer is made from step 52 to step 64 at which the damper 32 is closed if open during a standby period, or kept closed after main burner shutdown initiates a standby period.

After a transfer is made from step 52 to step 62 or step 64, the clock is reset, and the ambient/tank water/threshold temperature-based monitoring is continued at step 52 which may subsequently switch the damper control from step 62 to step 64, or from step 64 to step 62, as necessary depending on the sensed ambient temperature, tank water temperature and elapsed clock time.

As can be seen from the foregoing, the present invention uniquely provides for the control of a flue damper in a standing pilot type fuel-fired water heater based on various combinations of selected water heater set point temperature, sensed ambient temperature and sensed tank water temperature to prevent overheating of the water heater tank water during standby periods of the water heater.

The foregoing detailed description is to be clearly understood as being given by way of illustration and example only, the spirit and scope of the present invention being limited solely by the appended claims.

What is claimed is:
1. Fuel-fired liquid heating apparatus comprising:
a tank adapted to hold a quantity of liquid to be heated;
a combustion chamber adjacent to said tank;
a flue communicating with said combustion chamber and extending through said tank;
a damper structure disposed within said flue for controlled movement between open and closed positions;
a main fuel burner operative to discharge hot combustion products through said flue to heat liquid within said tank;
a standing pilot type fuel burner that discharges hot combustion products into said flue during standby periods of said fuel-fired liquid heating apparatus when said main burner is not firing;
an ambient temperature sensor that measures ambient temperature outside the tank; and
control apparatus having a selectively variable liquid temperature control set point temperature and having an ambient temperature threshold value different than and based on the liquid temperature control set point temperature, said control apparatus also being operable to determine the ambient temperature measured by the ambient temperature sensor, said control apparatus being arranged to open said damper or keep it in an open position, after said main burner is off and independent of a liquid temperature of the liquid in the tank, when the ambient temperature measured by the ambient temperature sensor is above the ambient temperature threshold value for a measurable, predetermined continuous time period to prevent overheating of the liquid in the tank by said standing pilot type fuel burner during standby periods of said fuel-fired liquid heating apparatus,
wherein the ambient temperature threshold value is a first value when the liquid temperature control set point temperature is within a first range of values, and wherein the ambient temperature threshold value is a second value when the liquid temperature control set point temperature is within a second range of values.

2. The fuel-fired liquid heating apparatus of claim 1 wherein:
said control apparatus is further operable to close said damper or keep it in a closed position, after said main burner is off and independent of the liquid temperature of the liquid in the tank, when the ambient temperature is below the ambient temperature threshold value.

3. The fuel-fired liquid heating apparatus of claim 1 wherein:
said control apparatus is further operable to open said damper or keep it in said open position, after said main burner is off and when the liquid temperature control set point temperature is within a first range of values, when the liquid temperature of the liquid in the tank exceeds the first range of values, and the ambient temperature exceeds the first value of the ambient temperature threshold value for a measurable, predetermined continuous time period to prevent overheating of the liquid in the tank by said standing pilot type fuel burner during standby periods of said fuel-fired heating apparatus.

4. The fuel-fired liquid heating apparatus of claim 1 wherein:
said second range of values of the liquid temperature control set point temperature is greater than said first range of values of the liquid temperature control set point temperature.

5. The fuel-fired liquid heating apparatus of claim 1 wherein:
said control apparatus is further operable to close said damper or keep it in said closed position, after said main burner is off, when the liquid temperature of the liquid in the tank is not above the ambient temperature threshold value to prevent overheating of the liquid in the tank by said standing pilot type fuel burner during standby periods of said fuel-fired heating apparatus.

6. The fuel-fired liquid heating apparatus of claim 1 wherein:
the first value of said ambient temperature threshold value is greater than the first range of values of said selected temperature control set point temperature.

7. The fuel-fired liquid heating apparatus of claim 1 wherein:
said control apparatus is further operative to generate the first value of the ambient temperature threshold value to be greater than the first range of values of said selected temperature control set point temperature, and to generate the second value of the ambient temperature threshold value to be greater than the second range of values of said selected temperature control set point temperature.

8. The fuel-fired liquid heating apparatus of claim 1 wherein:
said control apparatus is further operative to generate the first value of the ambient temperature threshold value to be greater than the first range of values of said selected temperature control set point temperature, and to generate the second value of the ambient temperature threshold value to be less than said selected temperature control set point temperature.

9. A fuel-fired water heater comprising:
a tank adapted to hold a quantity of water to be heated;
a combustion chamber adjacent to said tank;
a flue communicating with said combustion chamber and extending through said tank;
a damper structure disposed within said flue for controlled movement between open and closed positions;
a main fuel burner operative to discharge hot combustion products through said flue to heat water within said tank;
a standing pilot type fuel burner that discharges hot combustion products into said flue during standby periods of said fuel-fired liquid heating apparatus when said main burner is not firing;
an ambient temperature sensor that measures ambient temperature outside the tank; and
control apparatus having a selectively variable water temperature control set point temperature, a first ambient temperature threshold value, and a second ambient temperature threshold value, wherein the first ambient temperature threshold value is active and the second ambient temperature threshold value is inactive when the water temperature control set point temperature is within a first range of values, wherein the second ambient temperature threshold value is active and the first ambient temperature threshold value is inactive when the water temperature control set point temperature is within a second range of values, said control apparatus being further operable to:
(1) open said damper or keep it in said open position, after said main burner is off and independent of a water temperature of the water in the tank, when the ambient temperature measured by the ambient temperature sensor is above the first ambient temperature threshold value for a measurable, predetermined continuous time period to prevent overheating of the water in the tank by said standing pilot type fuel burner during standby periods of said fuel-fired water heater, and to close said damper or keep it in said closed position, after said main burner is off and independent of the water temperature of the water in the tank, when the ambient temperature measured by the ambient temperature sensor is below the first temperature threshold value, and
(2) open said damper or keep it in said open position, after said main burner is off and independent of the water temperature of the water in the tank, when the ambient temperature measured by the ambient temperature sensor is above the second ambient temperature threshold value for a measurable, predetermined continuous time period to prevent overheating of the water in the tank by said standing pilot type fuel burner during standby periods of said fuel-fired water heater, and to close said damper or keep it in said closed position, after said main burner is off and independent of the water temperature of the water in the tank, when the ambient temperature measured by the ambient temperature sensor is below the second ambient temperature threshold value,
wherein the second range of values for the water temperature control set point temperature is greater than the first range of values for the water temperature control set point temperature, and wherein the second ambient temperature threshold value is greater than the first ambient temperature threshold value.

10. The fuel-fired water heater of claim 9 wherein:
said control apparatus is further operative to generate the first ambient temperature threshold value having a magnitude related in a predetermined manner to the first range of values of said selected temperature control set point temperature, and to generate the second ambient temperature threshold value having a magnitude related in a predetermined manner to the second range of values of said selected temperature control set point temperature.

11. A method of preventing overheating of water in a tank that includes a fuel-fired water heater disposed in a location having an ambient temperature, said fuel-fired water heater having a tank adapted to hold a quantity of water to be heated, a combustion chamber adjacent to said tank, a flue communicating with said combustion chamber and extending through said tank, a damper structure disposed within said flue for controlled movement between open and closed positions, a main fuel burner operative to discharge hot combustion products through said flue to heat water within said tank, a standing pilot type fuel burner that discharges hot combustion products into said flue during standby periods of said fuel-fired water heater when said main burner is not firing, and a selectively variable water temperature control set point, comprising the steps of: determining a first range of values among a plurality of ranges of values for the water temperature control set point; determining a first ambient temperature threshold value among a plurality of ambient temperature threshold values, wherein the first ambient temperature threshold value corresponds to the first range of values of the water temperature control set point temperature determining the ambient temperature measured by an ambient temperature sensor; opening said damper or keeping it in said open position, after said main burner is off and independent of a water temperature of the water in the tank, when the ambient temperature measured by the ambient temperature sensor is above the first ambient temperature threshold value for a measurable, predetermined continuous time period to prevent overheating of the water in the tank by said standing pilot type fuel burner during standby periods of said fuel-fired water heater; and closing said damper or keeping it in said closed position, after said main burner is off and independent of the water temperature of the water in the tank, when the ambient temperature measured by the ambient temperature sensor is below the first ambient temperature threshold value.

12. The method of claim 11, further comprising:
sensing the water temperature of the water in the tank;
opening said damper or keeping it in said open position, after said main burner is off, when the water temperature of the water in the tank is above a second range of values of the water temperature control set point temperature that is greater than the first range of values of the water temperature control set point temperature and the ambient temperature measured by the ambient temperature sensor is above a second ambient temperature threshold value for a measurable, predetermined continuous time period to prevent overheating of the tank water by said standing pilot type fuel burner during standby periods of said fuel-fired water heater; and
closing said damper or keeping it in said closed position, after said main burner is off, when the ambient temperature is below the second ambient temperature threshold value or the water temperature of water in the tank is below the second range of values of the water temperature control set point temperature.

13. The fuel-fired liquid heating apparatus of claim 1, wherein the first range of values and the second range of values of the liquid temperature control set point temperature are determined by the control apparatus.

14. The fuel-fired liquid heating apparatus of claim 1, wherein the second value of the ambient temperature threshold parameter is greater than the second range of values of the liquid temperature control set point temperature, the first range of values of the liquid temperature control set point temperature, and the first value of the ambient temperature threshold parameter.

15. The method of claim 11, further comprising:
receiving a change to the water temperature control set point;
determining a second range of values among the plurality of ranges of values for the changed water temperature control set point;
determining a second ambient temperature threshold value among the plurality of ambient temperature threshold values, wherein the second ambient temperature threshold value corresponds to the second range of values of the water temperature control set point; and
opening said damper or keeping it in said open position, after said main burner is off and independent of the water temperature of the water in the tank, when the ambient temperature measured by the ambient temperature sensor is above the second ambient temperature threshold value for a measurable, predetermined continuous time period to prevent overheating of the water in the tank by said standing pilot type fuel burner during standby periods of said fuel-fired water heater.

* * * * *